Jan. 18, 1927.

A. PETER, 3D

AIR CLEANER

Filed May 8, 1925

1,614,897

WITNESSES
J. Herbert Bradley.

INVENTOR
Armistead Peter, 3D
By Green & McCallister
His Attorneys

Patented Jan. 18, 1927.

1,614,897

UNITED STATES PATENT OFFICE.

ARMISTEAD PETER, 3D, OF WASHINGTON, DISTRICT OF COLUMBIA.

AIR CLEANER.

Application filed May 8, 1925. Serial No. 28,818.

This invention relates to air cleaners and more particularly to that type of air cleaner used in connection with internal combustion engines.

The advantages of eliminating dirt or other solids from the air supplied to an internal combustion engine it too well known at this time to warrant description. Tests have shown that as high as 90% of the so called "carbon" deposit formed in the cylinders of this type of engine consist of small particles of dirt or dust which were present in the air drawn through the carburetor in forming the explosive charge.

The effort to eliminate foreign substances from this air has resulted in two distinct forms of cleaners, namely; centrifugal cleaners or those in which the air is subjected to a whirling motion in its passage to the carburetor so as to cause any dirt or the like to be separated from the air by centrifugal force, and filters in which the air is passed through or by a filtering material through which the dirt cannot travel. In one type the dirt is not removed as efficiently as desired. and in the other there is a tendency to clog up and resist the passage of the air therethrough resulting in a loss of power in the motor.

An object of this invention is to provide an air cleaner for the purpose set forth which will remove substantially all solid material from the air passing therethrough and which at the same time cannot clog or offer resistance to such passage of air.

A further object is to provide an air cleaner for use in internal combustion engines which will be simple and cheap to manufacture, rugged in construction and highly efficient in operation.

Figure 1:
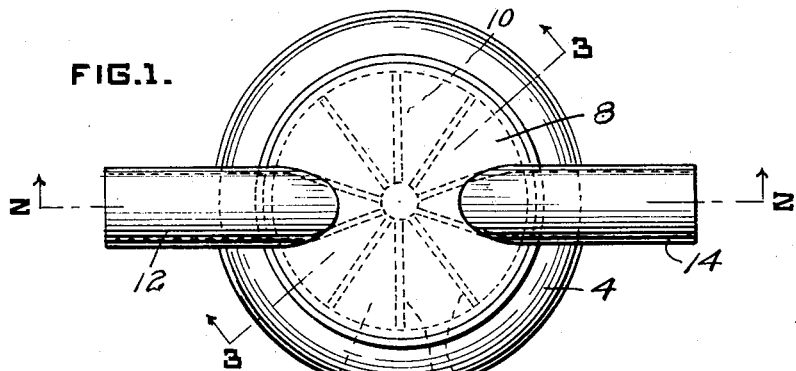
Figure 2:
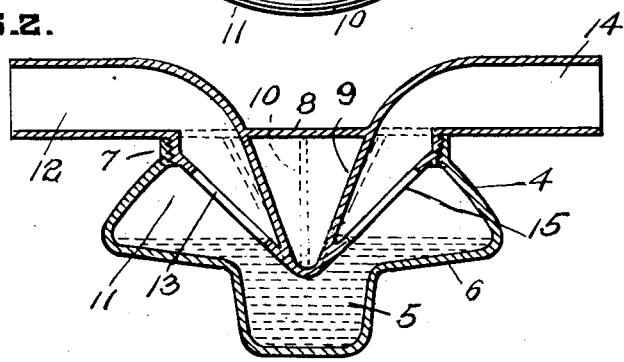
Figure 3:
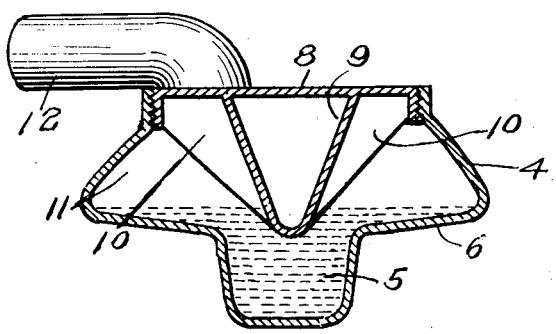

These and other objects which will be obvious to those skilled in this particular art are accomplished by means of this invention, one embodiment of which is shown for the purposes of illustration in the accompanying drawing, in which Figure 1 is a top plan view of a device showing one embodiment of this invention. Fig. 2 is a vertical transverse section on the line 2—2 of Fig. 1 and Fig. 3 is a similar view on the line 3—3 of Fig. 1.

The particular embodiment of this invention which has been chosen for the purposes of illustration includes a chamber adapted to contain oil or any other liquid to which dirt or other solids will adhere when brought into contact therewith. This chamber is so formed that vibration of the engine in connection with which it is used, or movement of the vehicle which the engine drives, will cause a certain splashing of the oil so as to provide an oil film upon the walls which enclose an air space above the level of the oil. An air inlet and an air outlet are provided and the stream of air passing through the chamber from the inlet to the outlet is so controlled that any solids contained in the air are brought into contact with the oil film and adhere thereto, the clean air then passing out of the device to the associated apparatus.

The illustrated embodiment of this invention includes a chamber 4 provided with an oil well 5 in the bottom thereof, and sloping walls 6 above the well. The upper open end of the chamber is provided with threads 7 for securing it to a closure member 8 which extends downwardly into the oil contained in the chamber. As illustrated, the closure is in the form of a cone 9 whose tip is submerged beneath the level of the oil, and the sides of the cone are provided with suitably shaped flanges or vanes 10 which extend into the air space 11 within the chamber above the oil.

A curved air inlet 12 is provided for admitting air through the closure into the air space 11 through an opening 13 which is suitably formed in the inner end of the inlet and preferably at one side of the air space 11. Preferably, and as shown, the opening 13 extends below the level of the oil or other liquid contained within the chamber. An air outlet 14, which may be similar in form to the inlet 12, provides a passage for the air from the chamber to the associated carburetor or other device. The inner end of the outlet 14 is provided with an opening 15 which is similar to the opening 13 of the air inlet and which also preferably extends below or in close proximity to the level of the liquid in the chamber.

As illustrated, the air directing vanes 10 are substantially triangular in form and extend downwardly below the level of the liquid as shown in Fig. 3. Vibration of the engine in connection with which the device is used, or movement of the vehicle which the engine operates, will cause the oil or other liquid to splash within the chamber 5 so as to form an oil film on the sloping walls thereof above the oil well, and also form such a film upon the vanes 10 and the walls of the inlet and outlet adjacent their respective openings 13 and 15. The curved air inlet causes a sudden change in the direction of the air stream entering the chamber so as to throw the dirt or other solids entrained in such stream into contact with the oil film upon the walls of the various parts around the opening 13 and also directly downwardly into the oil well. In passing from the inlet to the outlet the air stream is so controlled by the vanes 10 that the dust or the like is brought into contact with the oil film upon these vanes and upon the adjacent wall of the chamber, and in passing outwardly through the opening 15 the direction of the air stream is again suddenly changed so that any dirt remaining therein is brought into contact with the oil film formed upon the adjacent parts. The air outlet is, of course, connected directly to the inlet of an associated carburetor or similar device (not shown).

The oil or similar liquid constitutes an effective means for holding the dirt brought into contact therewith and preventing its passage through the device with the air. Any suitable form of liquid to which solid material will readily adhere can be used. The oil which constitutes the film is continually drained back into the oil well 5 and the walls and vanes are continually being supplied with fresh oil from the well which is splashed up onto these parts by movement of the vehicle or by vibration of the engine itself. The sides of the chamber 5, oil well and other parts will vary in accordance with the design and size of the associated engine. It will be found most advantageous to form the outwardly flaring walls 6 almost horizontal and provide sufficient oil to just cover the outwardly flaring part. In this way the maximum oil surface is provided by using a minimum volume of oil.

The oil containing chamber can be readily detached from the rest of the device for the purposes of cleaning and supplying fresh oil thereto, or, if desired, a drain opening, closed by a plug, can be provided at the bottom of the well and a filler opening and plug, formed in a convenient part of the chamber above the normal level of the liquid so that the device can be drained and flushed and have fresh liquid provided without removing the chamber.

Although I have described a specific embodiment of this invention, it will be obvious that various modifications, additions, substitutions and omissions can be made therein without departing from the spirit of this invention or the scope of the appended claim.

What I claim as new and desire to secure by Letters Patent is:

An air cleaner including in combination an oil containing chamber provided with outwardly flaring walls, a closure for said chamber extending thereinto, a curved air inlet in said closure, an air outlet and vanes on said closure extending into said chamber for directing a stream of air through said chamber in a circular path so as to cause solids carried by said air to be deposited in said oil.

In testimony whereof, I have hereunto subscribed my name this 30th day of April, 1925.

ARMISTEAD PETER, 3D.